United States Patent [19]

Snelson et al.

[11] Patent Number: 5,178,824
[45] Date of Patent: Jan. 12, 1993

[54] PARTICULATE COLLECTION APPARATUS

[75] Inventors: Barry Snelson; Frederick J. Moore; Peter B. MacAlpine, all of Preston, Great Britain

[73] Assignee: British Nuclear Fuels plc, Warrington, England

[21] Appl. No.: 737,026

[22] Filed: Jul. 29, 1991

[30] Foreign Application Priority Data

Aug. 1, 1990 [GB] United Kingdom ............... 9016900

[51] Int. Cl.$^5$ .............................................. G21C 3/00
[52] U.S. Cl. .................... 376/411; 376/409; 376/414
[58] Field of Search ............... 376/252, 245, 246, 411, 376/409, 414; 976/DIG. 87, DIG. 88, DIG. 89; 137/109; 73/590; 141/198, 83, 94

[56] References Cited

U.S. PATENT DOCUMENTS

| 3,171,714 | 3/1965 | Jones et al. ...................... 376/411 |
| 3,227,783 | 1/1966 | Williams ............................ 376/411 |
| 3,399,775 | 9/1968 | Ciaffone ............................ 210/221 |
| 3,616,917 | 11/1971 | Hellwege ........................... 210/167 |
| 3,724,484 | 4/1973 | Turman ............................. 376/252 |
| 3,812,890 | 5/1974 | Haas et al. ........................ 141/94 |
| 4,194,323 | 3/1980 | Blocker, Jr. ...................... 51/103 R |
| 4,348,279 | 9/1982 | Tikhonov et al. ................. 210/96.1 |

FOREIGN PATENT DOCUMENTS 1203192 10/1965 Fed. Rep. of Germany .
2088366 1/1972 France .
1297095 11/1972 United Kingdom .

Primary Examiner—Donald P. Walsh
Assistant Examiner—Neena Chelliah
Attorney, Agent, or Firm—William R. Hinds

[57] ABSTRACT

Particulates from a source fall into a tundish which discharges to a collection chamber. The build-up of particulates in the chamber is sensed, and a valve opened at the bottom of the chamber when a pre-determined level of the particulates is sensed in the chamber. A valve at the top of the chamber may be closed at the same time so that pressurized air can be injected into the chamber to expel the particulates through the bottom of the chamber through the valve. A filter circuit may be connected to the tundish to assist in removing particulates from the tundish.

12 Claims, 2 Drawing Sheets

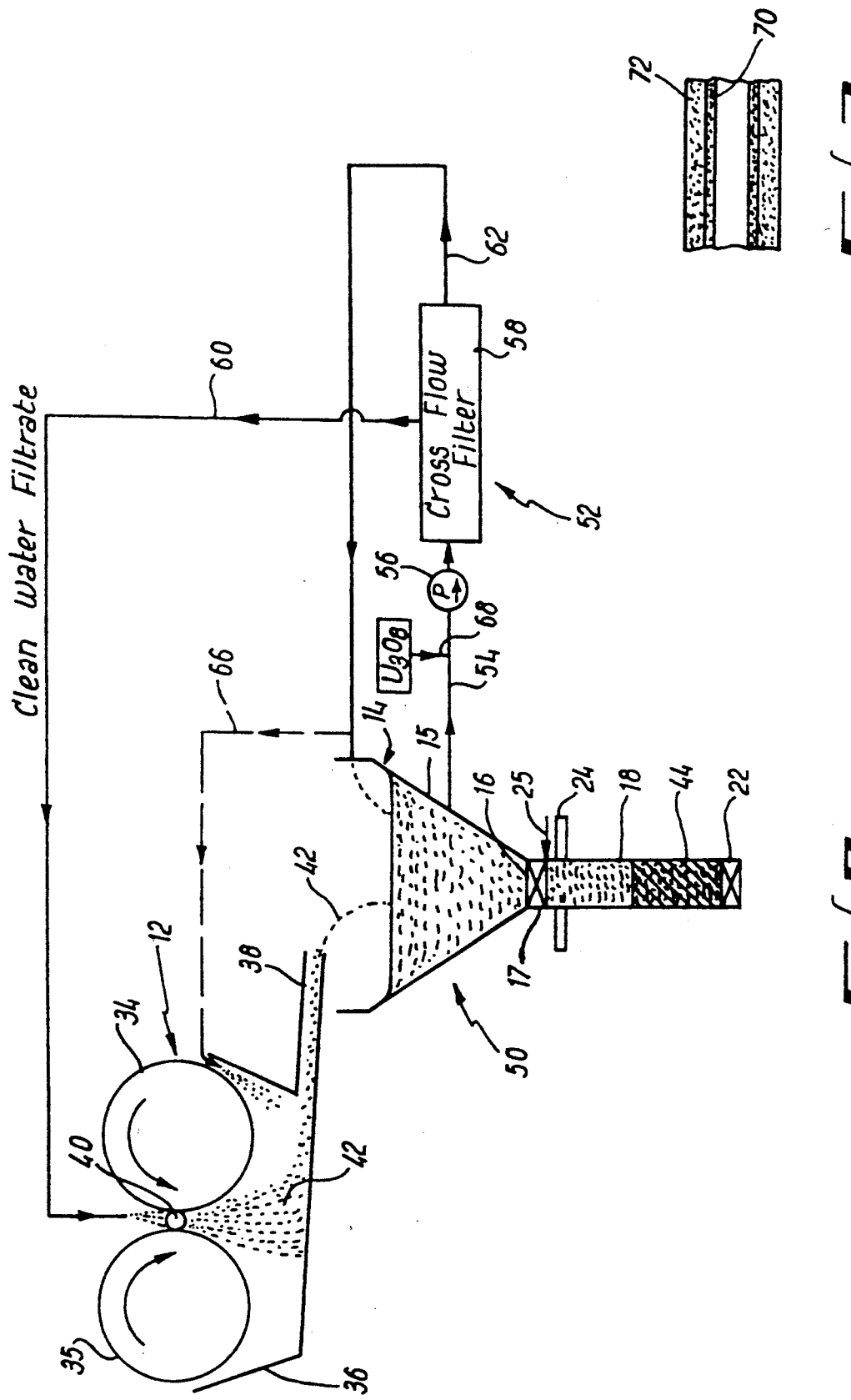

PARTICULATE COLLECTION APPARATUS

This invention relates to the collection of particulates and more particularly, but not exclusively, to the collection of particulate nuclear fuel.

During the manufacture of nuclear fuel, for example uranium oxide fuel in which pellets comprising uranium oxide are ground to size, particulate residue needs to be collected so that it can be returned for further processing.

According to the present invention, a particulate collection apparatus comprises a vessel having declivitous sides and a bottom outlet, a collection chamber having an upper inlet communicable with the bottom outlet and a lower outlet closable by a lower obturating means, and sensing means for sensing an accumulation of particulates at a predetermined level in the chamber.

Preferably, upper obturating means are provided between the sensing means and the bottom outlet, and air pressure means are provided between the upper obturating means and the sensing means.

Desirably, a filter circuit is connected to the vessel for passing liquid in the vessel through a filter means, preferably a cross-flow filter means.

Advantageously, a particulate coating comprising $U_3O_8$ is applied to the ingress side of the cross-flow filter. In one application of the invention, the apparatus is adapted to receive a liquid slurry from a grinding apparatus, said liquid being recycled from the collection apparatus to the grinding apparatus.

The invention will now be further described by way of example only with reference to the accompanying drawings, in which:

FIG. 2 shows a schematic representation of a modified form of the apparatus of FIG. 1, and FIG. 3 shows a fragmentary sectional representation of a filter element of FIG. 2.

In the above figures, like parts have like numerals.

Figure 1:
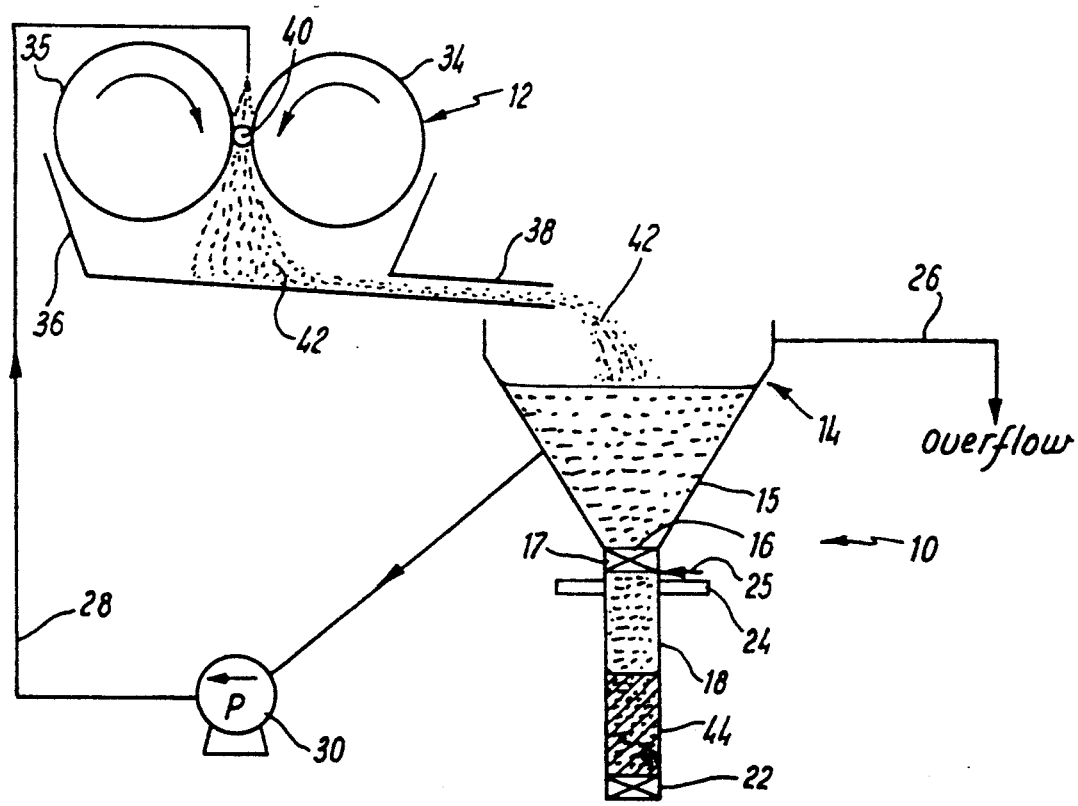
FIG. 1 shows a schematic representation of grinding and collection apparatus in the manufacture of nuclear fuel.

Referring now to FIG. 1, a collection apparatus 10 is shown for collection of particulates from a grinding apparatus 12. The collection apparatus 10 comprises a vessel 14 having declivitous sides 15 descending to an outlet 16 connected to one side of a top valve 17. A tubular upright collection chamber 18 is connected at its upper end to the other side of the top valve 17, and is closable at its lower end by a lower valve 22. An ultrasonic sensor 24 is positioned just below the top valve 17 to monitor particulate level at that position in the chamber 18, and a compressed air inlet 25 into the chamber 18 locates between the sensor 24 and the top valve 17. An overflow 26 extends near the top of the vessel 14, and a recirculation circuit 28 including a pump 30 is connected between the declivitous sides 15 to a position above the grinding apparatus 12.

The grinding apparatus 12 comprises parallel grinding wheels 34, 35 respectively located above a trough 36 which has a bottom outlet 38 extending so as to discharge into the vessel 14.

In operation, nuclear fuel pellets 40 (eg uranium oxide) are fed between and along the grinding wheels 34, 35 to provide a required diameter of pellet 40. The recirculation circuit 28 discharges water over the grinding wheels 34, 35 and the water together with particulates 42 (eg 1 to 4 $\mu$m) drop into the trough 36 and from there through the outlet 38 into the vessel 14. With the top valve 17 open and the lower valve 22 closed, the particulates 42 fall and settle in the chamber 18, whilst the water is recirculated by the recirculation circuit 28, any water flowing through the overflow 26 being collected and subsequently returned to the vessel 14.

The particulates 42 gradually collect as a sludge 44 in the chamber 18 until they reach a level where they are detected by the sensor 24. The top valve 17 is then closed, the lower valve 22 opened, and compressed air introduced for a short period through the inlet 25 to eject the sludge 44 from the bottom of the chamber 18. The lower valve 22 is then closed, and the top valve 17 opened, to repeat the collection cycle in the chamber 18.

Referring now to the modification shown in FIG. 2, the collection apparatus 50 shown is in many respects identical to the collection apparatus 12 of FIG. 1, except that in place of the recirculation circuit 28 of FIG. 1, a filter circuit 52 is used. The filter circuit 52 comprises an outlet pipe 54 from the vessel 14 connected to a pump 56 arranged to discharge to a conventional cross-flow filter 58. A clean water filtrate outlet 60 from the filter 58 is arranged to discharge between the grinding wheels 34, 35, whilst a through-flow outlet 62 from the filter 58 is returned into the vessel 14 above the outlet pipe 54. As an option, a flush-down pipe 66 (shown in broken line) may be connected between the through-flow outlet 62 and the side of the trough 36 to assist in flushing the particulates 42 from the trough 36 into the vessel 14.

In order to inhibit rapid blocking of the filter 58 from the particulate 42, an initial feed of particulate $U_3O_8$ may be introduced at 68 to form a permeable coating 70 (see FIG. 3) at the ingress side of filter element 72 of the filter 58. For example, particulate $U_{38}$ having a size distribution of between 45 and 90 $\mu$m at a loading of about 229 gm in 30 liters of water mixed with $U_3O_8$ having a size distribution of $1 < 45$ $\mu$m at a loading of about 50 gm in 30 liters of water has been found suitable to provide an effective coating.

An example of a suitable cross-flow filter 58 may be obtained from:

Fairy Microfiltrex Limited
Fareham Industrial Park
Fareham
Hampshire
P016 8XO
United Kingdom An example of a suitable sensor 24 to sense a sludge interface may be obtained from:

Bestobell Mobrey
190-196 Bath Road
Slough
Berkshire
SL1 4DN
United Kingdom

It will be appreciated that the sensor may form part of a circuit for automatically operating the top valve 17, the lower valve 22, and the air inlet 25 in response to signals from the sensor. With some particulates and with frequent discharge of the sludge 44, the use of the air inlet 25 might be dispensed with.

Although the invention has been described in relation to the manufacture of nuclear oxide fuels, the invention has applications with alternative nuclear fuels, and for non-nuclear materials.

It will be understood that although obturating means in the form of valve means (eg ball valve means) have been described in relation to FIGS. 1 and 2, alternative suitable obturating means may be used preferably to provide a relatively clear axial path for the discharge of the sludge 44 therethrough.

We claim:

1. Apparatus for grinding nuclear fuel pellets including means for grinding the pellets in the presence of liquid, the improvement comprising a trough located below the grinding means for collecting liquid and grinding particulates therefrom, an outlet from the trough arranged to discharge said liquid and the grinding particulates into a vessel having declivitous sides and a bottom outlet, a collection chamber having an upper inlet communicable with the bottom outlet and having a lower outlet, a lower obturating means at the lower outlet, sensing means for sensing an accumulation of the grinding particulates at a predetermined level in the collection chamber, the lower obturating means being responsive to the sensing means, a recirculation circuit connected at one end to the declivitous sides of the vessel and having the other end thereof arranged to discharge at the grinding means, and pump means for circulating the liquid from the vessel through the recirculation circuit.

2. An apparatus as claimed in claim 1, further comprising upper obturating means between the sensing means and the bottom outlet, said upper obturating means being arranged to be opened when the lower obturating means is closed and to be closed when the lower obturating means is opened by the sensing means, and means for applying air pressure between the upper obturating means and the sensing means when the upper obturating means is closed and the lower obturating means is open.

3. An apparatus as claimed in claim 2, wherein a filter circuit is connected in the recirculation circuit for recirculating therethrough said liquid from the vessel.

4. An apparatus as claimed in claim 3, wherein the filter circuit includes the pump means connected in series therein.

5. Apparatus as claimed in claim 4, wherein the filter circuit includes cross-flow filter means.

6. Apparatus as claimed in claim 5, wherein a particulate coating applied to the cross-flow filter means inhibits rapid blocking of the cross-flow filter means.

7. Apparatus as claimed in claim 3, wherein a flush duct extends between the filter circuit and the trough so as to flush the trough with liquid from the vessel.

8. Apparatus as claimed in claim 5, wherein a through-flow outlet of the cross-flow filter means is connected so as to discharge into the vessel.

9. Apparatus as claimed in claim 5, wherein a filtrate outlet of the cross-flow filter means is connected so as to discharge through the recirculation circuit.

10. Apparatus as claimed in claim 6, wherein the coating comprises $U_3O_8$.

11. Apparatus as claimed in claim 10, wherein the $U_3O_8$ comprises particulates thereof having a size distribution between 45 and 90 microns and particulates thereof having a size distribution between 1 and 45 microns.

12. Apparatus as claimed in claim 11, wherein the $U_3O_8$ particulates having said first mentioned size distribution and said second mentioned size distribution, respectively, are in the weight ratio of about 229 to 50.

* * * * *